US012412904B2

(12) United States Patent
Lin et al.

(10) Patent No.: US 12,412,904 B2
(45) Date of Patent: Sep. 9, 2025

(54) NEGATIVE ELECTRODE PLATE, ELECTROCHEMICAL DEVICE, AND ELECTRONIC DEVICE

(71) Applicant: Ningde Amperex Technology Limited, Fujian (CN)

(72) Inventors: Xiaoping Lin, Fujian (CN); Maohua Chen, Fujian (CN); Yuansen Xie, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 755 days.

(21) Appl. No.: 17/709,660

(22) Filed: Mar. 31, 2022

(65) Prior Publication Data
US 2022/0328845 A1    Oct. 13, 2022

Related U.S. Application Data

(63) Continuation of application No. PCT/CN2021/084495, filed on Mar. 31, 2021.

(51) Int. Cl.
*H01M 4/78* (2006.01)
*H01M 4/02* (2006.01)
*H01M 4/66* (2006.01)
*H01M 10/0525* (2010.01)

(52) U.S. Cl.
CPC ............ *H01M 4/78* (2013.01); *H01M 4/661* (2013.01); *H01M 4/663* (2013.01); *H01M 10/0525* (2013.01); *H01M 2004/021* (2013.01); *H01M 2004/027* (2013.01)

(58) Field of Classification Search
CPC ........ H01M 4/661; H01M 4/663; H01M 4/78; H01M 2004/027
See application file for complete search history.

(56) References Cited

U.S. PATENT DOCUMENTS

| 2009/0269677 A1* | 10/2009 | Hirose ................ H01M 4/626 429/200 |
| 2009/0305135 A1 | 12/2009 | Shi et al. |
| 2016/0043384 A1 | 2/2016 | Zhamu et al. |
| 2017/0110728 A1* | 4/2017 | Kobayashi ............ H01M 4/133 |
| 2020/0168899 A1 | 5/2020 | Jang |

FOREIGN PATENT DOCUMENTS

| CN | 105332097 A | 2/2016 |
| CN | 107732204 A | 2/2018 |
| CN | 107799736 A | 3/2018 |
| CN | 108365200 A | 8/2018 |
| CN | 108642606 A | 10/2018 |
| CN | 109088051 A | 12/2018 |
| CN | 109546141 A | 3/2019 |
| CN | 110380010 A | 10/2019 |
| CN | 110571413 A | 12/2019 |
| CN | 110707294 A | 1/2020 |
| CN | 110854380 A | 2/2020 |
| CN | 110890530 A | 3/2020 |
| CN | 110993892 A | 4/2020 |
| CN | 110993954 A | 4/2020 |
| CN | 111063893 A | 4/2020 |
| CN | 111082066 A | 4/2020 |
| CN | 112151799 A | 12/2020 |
| EP | 3086388 A1 | 10/2016 |

OTHER PUBLICATIONS

International Search Report issued on Dec. 30, 2021 in corresponding International Patent Application No. PCT/CN2021/084495; 4 pages.
Extended Search Report issued on Nov. 14, 2023, in corresponding European Application No. 21867905.8, 8 pages.
Office Action issued on Jan. 20, 2023, in corresponding Chinese Application No. 202180004697.8, 18 pages.
Office Action issued on Jun. 3, 2023, in corresponding Chinese Application No. 202180004697.8, 16 pages.
Office Action issued on Jul. 29, 2023, in corresponding Chinese Application No. 202180004697.8, 10 pages.

\* cited by examiner

*Primary Examiner* — Brittany L Raymond
(74) *Attorney, Agent, or Firm* — Maier & Maier, PLLC

(57) ABSTRACT

A negative electrode plate includes a three-dimensional framework structure. The three-dimensional framework structure includes fibers and rigid particles. Mohs hardness of the rigid particles is greater than or equal to 2, and an elastic modulus of the rigid particles is greater than or equal to 40 Gpa. The three-dimensional framework structure can mitigate volume expansion of the negative active material during cycling. On the other hand, the rigid particles help to stabilize the three-dimensional framework structure and can serve as a lithium wetting material to induce lithium to deposit inside the three-dimensional framework, thereby reducing the generation of lithium dendrites and improving safety performance and cycle performance of the formed electrochemical device.

19 Claims, No Drawings

NEGATIVE ELECTRODE PLATE, ELECTROCHEMICAL DEVICE, AND ELECTRONIC DEVICE

CROSS REFERENCE TO RELATED APPLICATIONS

The present application is a bypass continuation application of PCT application PCT/CN2021/084495, filed on Mar. 31, 2021, the disclosure of which is hereby incorporated by reference in its entirety.

TECHNICAL FIELD

This application relates to the field of electrochemical energy storage, and in particular, to a negative electrode plate, an electrochemical device, and an electronic device.

BACKGROUND

With the development and progress of electrochemical devices (such as a lithium-ion battery), higher requirements have been posed on the cycle performance and energy density of the battery. Currently, to increase the energy density of an electrochemical device, some negative active materials of a high gram capacity (such as lithium metal and silicon-based materials) are generally put into use. However, as the number of cycles increases, the negative active materials of a high gram capacity incur significant volume expansion, thereby causing problems such as defilming of a negative active material layer and deteriorating the cycle performance of the electrochemical device.

Therefore, how to improve the cycle performance of the electrochemical device while ensuring a high energy density of the electrochemical device is still an urgent problem to be solved.

SUMMARY

Some embodiments of this application provide a negative electrode plate. The negative electrode plate includes a three-dimensional framework structure. The three-dimensional framework structure includes fibers and rigid particles. Mohs hardness of the rigid particles is greater than or equal to 2, and an elastic modulus of the rigid particles is greater than or equal to 40 Gpa.

In some embodiments, a thickness of the three-dimensional framework structure is 18 μm to 200 μm. In some embodiments, a total mass percent of the rigid particles in the three-dimensional framework structure is 5% to 95%, and preferably 26.7% to 60%. In some embodiments, a porosity of the three-dimensional framework structure is 5% to 95%. In some embodiments, the negative electrode plate further includes a negative current collector. The three-dimensional framework structure is located on the negative current collector. A mass percent of the rigid particles close to the negative current collector and contained in the three-dimensional framework structure is greater than a mass percent of the rigid particles away from the negative current collector and contained in the three-dimensional framework structure. In some embodiments, the mass percent of the rigid particles in the three-dimensional framework structure decreases stepwise with increase of remoteness from the negative current collector. In some embodiments, the three-dimensional framework structure is equally divided into a first part, a second part, and a third part in a thickness direction of the three-dimensional framework structure in ascending order of a distance from the negative current collector. A mass percent of the rigid particles in the first part is greater than 60%. A mass percent of the rigid particles in the second part is 20% to 60%. A mass percent of the rigid particles in the third part is less than 20%. In some embodiments, an average particle diameter D50 of the rigid particles is 100 nm to 20 μm. In some embodiments, the rigid particles include metal, metal alloy, metal oxide, metal nitride, metal sulfide, metal carbide, or a polymer. In some embodiments, the rigid particles include at least one of Ag, Au, Zn, $TiO_2$, $SiO_2$, ZnO, $SnO_2$, $Co_3O_4$, $Fe_2O_3$, $Mo_2N_3$, $MoS_2$, $SnS_2$, or a polymer containing at least one of the following groups: a hydroxyl group, an ester group, a carboxyl group, an amino group, or a sulfo group. In some embodiments, the fibers include at least one of a metal fiber, a carbon-based material fiber, or a polymer fiber. In some embodiments, the fibers include at least one of stainless steel fiber felt, nickel wire, copper wire, silver wire, single-walled carbon nanotube, multi-walled carbon nanotube, pure carbon fiber, doped carbon fiber, silica nanowire, glass fiber nanowire, polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, or polyvinylidene difluoride-chlorotrifluoroethylene. In some embodiments, a diameter of the fibers is 100 nm to 20 μm. In some embodiments, a thickness deformation amount t of the three-dimensional framework structure under compression and a thickness T of the three-dimensional framework structure satisfy: t≤10% T. In some embodiments, a thickness h of a part that is of the three-dimensional framework structure and that contains lithium element and the thickness T of the three-dimensional framework structure satisfy: h≥30% T.

Some embodiments of this application provide an electrochemical device. The electrochemical device includes a positive electrode plate, a negative electrode plate, and a separator located between the positive electrode plate and the negative electrode plate. The negative electrode plate is any one of the negative electrode plates described above.

An embodiment of this application further provides an electronic device, including the electrochemical device.

In the embodiments of this application, a three-dimensional framework structure includes fibers and rigid particles. The Mohs hardness of the rigid particles is greater than or equal to 2, and the elastic modulus of the rigid particles is greater than or equal to 40 Gpa. On the one hand, the three-dimensional framework structure can mitigate volume expansion of the negative active material during cycling. On the other hand, the rigid particles help to stabilize the three-dimensional framework structure and can serve as a lithium wetting material to induce lithium to deposit inside the three-dimensional framework, thereby reducing the generation of lithium dendrites and improving safety performance and cycle performance of the formed electrochemical device.

DETAILED DESCRIPTION

The following embodiments enable a person skilled in the art to understand this application more comprehensively, but without limiting this application in any way.

Some embodiments of this application provide a negative electrode plate. The negative electrode plate includes a three-dimensional framework structure. The three-dimensional framework structure includes fibers and rigid particles. The three-dimensional framework structure can provide sufficient space for lithium deposition, and reduce volume change of the negative electrode plate during charging and discharging. In some embodiments, in the three-dimensional framework structure, the fibers mainly serve to prop the framework, and the rigid particles are distributed in the framework formed by the fibers, so as to stabilize the three-dimensional framework structure.

In some embodiments, Mohs hardness of the rigid particles is greater than or equal to 2, and an elastic modulus of the rigid particles is greater than or equal to 40 Gpa. If the Mohs hardness of the rigid particles is too low or the elastic modulus is too small, the rigid particles can hardly serve to stabilize the three-dimensional framework structure. Consequently, the three-dimensional framework structure is prone to deform under the impact of expansion of intercalated lithium during cycling.

In the embodiments of this application, a three-dimensional framework structure includes fibers and rigid particles. On the one hand, the three-dimensional framework structure can mitigate adverse effects caused to the negative electrode plate by the volume expansion of the deposited lithium during cycling. On the other hand, the rigid particles help to stabilize the three-dimensional framework structure and can serve as a lithium wetting material to induce lithium to deposit inside the three-dimensional framework, thereby reducing the generation of lithium dendrites and improving safety performance and cycle performance of the formed electrochemical device. The existence of the lithium dendrites decreases a lithium deposition density greatly, and decreases the energy density. In addition, the lithium dendrites may pierce the separator to cause a short circuit and cause safety problems. In some embodiments, the three-dimensional framework structure can disperse a current, reduce a local current density, improve a deposition morphology of the lithium metal, and suppress the formation of lithium dendrites. In some embodiments, the rigid particles may be mixed with the fibers to improve rigidity and pressure withstanding performance of the three-dimensional framework structure, and ensure that the negative electrode plate will not deform under compression. In this way, the three-dimensional framework can keep structural stability in a process of depositing and peeling off lithium metal. In addition, the rigid particles can serve as a lithium wetting material.

When a lithium wetting material exists in the three-dimensional framework structure, lithium is more prone to enter the three-dimensional framework structure to induce the lithium metal to deposit inside the three-dimensional framework structure, thereby mitigating the volume expansion of the negative electrode plate and reducing the formation of lithium dendrites or lithium plating on the surface of the negative electrode.

In some embodiments, a thickness of the three-dimensional framework structure is 18 μm to 200 μm. In some embodiments, if the thickness of the three-dimensional framework structure is lower than 18, even if the lithium metal is deposited at a maximum deposition density during deposition, the three-dimensional framework structure usually still cannot accommodate all the lithium metal. Therefore, a part of the lithium metal is deposited outside the three-dimensional framework structure. The volume expansion of the lithium metal deposited outside the three-dimensional framework structure is unable to be mitigated. If the thickness of the three-dimensional framework structure is greater than 200 μm, the energy density of the entire electrochemical device will be greatly reduced.

In some embodiments, a total mass percent of the rigid particles in the three-dimensional framework structure is 5% to 95%. When the mass percent of the rigid particles in the three-dimensional framework structure is lower than 5%, the lithium wetting effect brought by the rigid particles is limited. When the mass percent of the rigid particles in the three-dimensional framework structure is higher than 95%, the fiber content is too low to form a self-supporting three-dimensional framework structure. In some embodiments, the total mass percent of the rigid particles in the three-dimensional framework structure is 26.7% to 60%. In this way, the three-dimensional framework structure can achieve relatively high mechanical performance, and is not prone to deform under an external force or under the action of expansion of an intercalated material (such as lithium metal) during cycling. Therefore, the thickness deformation amount t of the three-dimensional framework structure under compression and a thickness T of the three-dimensional framework structure satisfy: t≤10% T.

In some embodiments, a porosity of the three-dimensional framework structure is 5% to 95%. If the porosity of the three-dimensional framework structure is too low, the space in the three-dimensional framework structure will be not enough for accommodating the lithium metal. If the porosity of the three-dimensional framework structure is too high, the structural stability of the three-dimensional framework structure can be hardly maintained. The porosity of the three-dimensional framework structure is set to 5% to 95%, so that the space in the three-dimensional framework structure is enough for accommodating the lithium metal and maintaining structural stability during lithium deposition.

In some embodiments, the negative electrode plate further includes a negative current collector. The three-dimensional framework structure is located on the negative current collector. In some embodiments, the three-dimensional framework structure may be located on one side or both sides of the negative current collector. In some embodiments, a mass percent of the rigid particles close to the negative current collector and contained in the three-dimensional framework structure is greater than a mass percent of the rigid particles away from the negative current collector and contained in the three-dimensional framework structure. As mentioned above, the rigid particles may serve as a lithium wetting material. When the three-dimensional framework structure contains no lithium wetting material, the lithium metal tends to deposit on the surface of the three-dimensional framework structure. When the three-dimensional framework structure contains a lithium wetting material, a part of the lithium enters the three-dimensional framework structure, but still a considerable amount of lithium metal is deposited on the surface of the three-dimensional framework structure. Therefore, in the process of improving the rigidity of the three-dimensional framework structure by using the rigid particles, stepwise distribution of lithium wettability (the mass percent of the rigid particles close to the negative current collector is high, and the mass percent of the rigid particles away from the negative current collector is low) is implemented by using the wetting effect of the rigid particles. Therefore, the lithium metal is further induced to be deposited inside the three-dimensional framework structure, thereby improving the volume expansion of the negative electrode plate and the cycle performance of the electrochemical device.

In some embodiments, the mass percent of the rigid particles in the three-dimensional framework structure decreases stepwise with increase of remoteness from the negative current collector. Through the stepwise distribution of the rigid particles, the lithium metal is induced to deposit inside the three-dimensional framework structure, thereby mitigating the volume expansion of the negative electrode plate and improving the cycle performance of the electrochemical device.

In some embodiments, the three-dimensional framework structure is equally divided into a first part, a second part, and a third part in a thickness direction of the three-dimensional framework structure in ascending order of a distance from the negative current collector. A mass percent of the rigid particles in the first part is greater than 60%. A mass percent of the rigid particles in the second part is 20% to 60%. A mass percent of the rigid particles in the third part is less than 20%. In this way, the three-dimensional framework structure can achieve relatively high mechanical performance, and is not prone to deform under an external force or under the action of expansion of an intercalated material (such as lithium metal) during cycling. Therefore, the thickness deformation amount t of the three-dimensional framework structure under compression and a thickness T of the three-dimensional framework structure satisfy: t≤10% T, as described below.

In some embodiments, an average particle diameter of the rigid particles is 100 nm to 20 jam. If the average particle diameter of the rigid particles is less than 100 nm, the rigid particles is unable to serve a supporting function sufficiently. When the average particle diameter of the rigid particles is greater than 20 μm, the three-dimensional framework structure will be stratified. In addition, when the average particle diameter of the rigid particles is too large, the three-dimensional framework structure of the negative electrode plate is unable to be well maintained, the homogeneity of lithium deposition will be impaired, and the three-dimensional framework structure will be less effective in improving lithium deposition.

In some embodiments, the rigid particles include metal, metal alloy, metal oxide, metal nitride, metal sulfide, metal carbide, or a polymer. In some embodiments, the rigid particles include at least one of Ag, Au, Zn, $TiO_2$, $SiO_2$, ZnO, $SnO_2$, $Co_3O_4$, $Fe_2O_3$, $Mo_2N_3$, $MoS_2$, $SnS_2$, or a polymer containing at least one of the following groups: a hydroxyl group, an ester group, a carboxyl group, an amino group, or a sulfo group. The rigid particles can, on the one hand, serve to stabilize the three-dimensional framework structure, and on the other hand, serve as a lithium wetting material to induce the lithium to deposit inside the three-dimensional framework, thereby mitigating the expansion of the lithium metal during cycling and reducing the formation of lithium dendrites. In some embodiments, the shape of the rigid particles may be any shape that can serve a supporting function, such as a sphere, a hollow sphere, a cube, a triangle, a rhombus, or a core-shell structure.

In some embodiments, the fibers include at least one of a metal fiber, a carbon-based material fiber, or a polymer fiber. In some embodiments, the fibers include at least one of stainless steel fiber felt, nickel wire, copper wire, silver wire, single-walled carbon nanotube, multi-walled carbon nanotube, pure carbon fiber, doped carbon fiber, silica nanowire, glass fiber nanowire, polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, or polyvinylidene difluoride-chlorotrifluoroethylene. The fibers may serve to form a three-dimensional framework structure. In some embodiments, the fibers may be solid, hollow, or multilayer structural fibers.

In some embodiments, a diameter of the fibers is 100 nm to 20 μm. If the diameter of each fiber is less than 100 nm, the fiber is hardly manufacturable. If the diameter of the fiber is greater than 20 μm, the electrochemical device is very prone to short-circuit, and the excessive diameter of the fiber leads to relatively low mechanical performance of the formed three-dimensional framework structure.

In some embodiments, a thickness deformation amount t of the three-dimensional framework structure under compression and a thickness T of the three-dimensional framework structure satisfy: t≤10% T. In some embodiments, the thickness deformation amount t of the three-dimensional framework structure under a 130 kg pressure and the thickness T of the three-dimensional framework structure satisfy: t≤10% T. The three-dimensional framework structure that meets such a requirement achieves excellent mechanical performance and is fairly effective in mitigating the expansion of the lithium metal during cycling.

In some embodiments, a thickness h of a part that is of the three-dimensional framework structure and that contains lithium element and the thickness T of the three-dimensional framework structure satisfy: h≥30% T. In this way, the expansion of the lithium metal can be well mitigated, and the lithium dendrites can be reduced.

In some embodiments, the rigid particles are mixed with the fibers by performing both electrospinning and electrospraying. In addition, the stepwise distribution of the lithium-wetting rigid particles is implemented by controlling an electrospraying concentration, time, and feed speed. Understandably, this is merely exemplary but not intended to limit this application. Other appropriate methods may be adopted. In some embodiments, after the three-dimensional framework structure is formed, the three-dimensional framework structure may be pre-replenished with lithium, and a lithium sheet may be calendered on the surface of the three-dimensional framework structure.

In some embodiments, the fibers may be mixed with the lithium-wetting rigid particles to improve the pressure-resistance performance and mechanical performance of the three-dimensional framework structure, and ensure that the electrode plate will not deform when the electrochemical device is compressed. In this way, the three-dimensional framework structure can keep structural stability in the process of depositing and peeling off the lithium metal. In addition, the stepwise distribution of the rigid particles (the mass percent of the rigid particles close to the negative current collector is high, and the mass percent of the rigid particles away from the negative current collector is low) can induce the lithium metal to deposit in a bottom-up manner inside the three-dimensional framework structure. Therefore, the deposition of the lithium metal inside the three-dimensional framework is implemented, the volume expansion of the electrochemical device is mitigated, and the cycle life of the electrochemical device is increased.

An embodiment of this application further provides an electrochemical device. The electrochemical device includes an electrode assembly. The electrode assembly includes a positive electrode plate, a negative electrode plate, and a separator disposed between the positive electrode plate and the negative electrode plate. In some embodiments, the negative electrode plate is any of the negative electrode plates described above.

In some embodiments, the positive electrode plate includes a current collector and a positive active material layer disposed on the current collector. The positive active material layer may include a positive active material. In some embodiments, the positive active material includes at least one of lithium cobalt oxide, lithium iron phosphate, lithium iron manganese phosphate, sodium iron phosphate, lithium vanadium phosphate, sodium vanadium phosphate, lithium vanadyl phosphate, sodium vanadyl phosphate, lithium vanadium oxide, lithium manganese oxide, lithium nickel oxide, lithium nickel cobalt manganese oxide, lithium-rich manganese-based material, or lithium nickel cobalt aluminum oxide. In some embodiments, the positive active material layer may further include a conductive agent. In some embodiments, the conductive agent in the positive active material layer may include at least one of conductive carbon black, Ketjen black, graphite flakes, graphene, carbon nanotubes, or carbon fiber. In some embodiments, the positive active material layer may further include a binder. The binder in the positive active material layer may include at least one of carboxymethyl cellulose (CMC), polyacrylic acid, polyvinylpyrrolidone, polyaniline, polyimide, polyamideimide, polysiloxane, styrene butadiene rubber, epoxy resin, polyester resin, polyurethane resin, or polyfluorene. In some embodiments, a mass ratio of the positive active material, the conductive agent, and the binder in the positive active material layer may be (80 to 99):(0.1 to 10):(0.1 to 10). In some embodiments, the thickness of the positive active material layer may be 10 μm to 500 μm. Understandably, the foregoing is merely an example, and the positive active material layer may adopt any other appropriate material, thickness, and mass ratio.

In some embodiments, the current collector of the positive electrode plate may be an aluminum foil, or may be another current collector commonly used in the art. In some embodiments, the thickness of the current collector of the positive electrode plate may be 1 μm to 50 μm. In some embodiments, the positive active material layer may be coated on merely a partial region of the current collector of the positive electrode plate.

In some embodiments, the separator includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. Especially the polyethylene and the polypropylene are highly effective in preventing short circuits, and improve stability of the battery through a turn-off effect. In some embodiments, the thickness of the separator is within a range of approximately 5 μm to 50 μm.

In some embodiments, a porous layer may be further included in a surface of the separator. The porous layer is disposed on at least one surface of the separator. The porous layer includes inorganic particles and a binder. The inorganic particles is at least one selected from aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a diameter of a pore of the separator is within a range of approximately 0.01 μm to 1 μm. The binder in the porous layer is at least one selected from polyvinylidene difluoride, a vinylidene difluoride-hexafluoropropylene copolymer, a polyamide, polyacrylonitrile, polyacrylic ester, polyacrylic acid, sodium polyacrylate, sodium carboxymethyl cellulose, polyvinylpyrrolidone, polyvinyl ether, poly methyl methacrylate, polytetrafluoroethylene, or polyhexafluoropropylene. The porous layer on the surface of the separator can improve heat resistance, oxidation resistance, and electrolyte infiltration performance of the separator, and enhance adhesion between the separator and the electrode plate.

In some embodiments of this application, the electrode assembly of the electrochemical device is a jelly-roll electrode assembly, a stacked electrode assembly, or a folded electrode assembly. In some embodiments, the positive electrode and/or negative electrode of the electrochemical device may be a multi-layer structure formed by winding or stacking, or may be a single-layer structure formed by stacking a single layer of positive electrode, a separator, and a single layer of negative electrode.

In some embodiments, the electrochemical device includes, but is not limited to, a lithium-ion battery. In some embodiments, the electrochemical device may further include an electrolyte. The electrolyte may be one or more of a gel electrolyte, a solid-state electrolyte, and an electrolytic solution. The electrolytic solution includes a lithium salt and a nonaqueous solvent. The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, the lithium salt is $LiPF_6$ because it is of a high ionic conductivity and can improve cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the chain carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (EMC), or any combination thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1, 2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof.

Examples of the carboxylate compound are methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, methyl formate, or any combination thereof.

Examples of the ether compound are dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or any combination thereof.

In some embodiments of this application, using a lithium-ion battery as an example, the lithium-ion battery is prepared by: winding or stacking the positive electrode, the separator, and the negative electrode sequentially into an electrode assembly, putting the electrode assembly into a package such as an aluminum plastic film ready for sealing, injecting an electrolytic solution, and performing chemical formation and sealing; Then a performance test is performed on the prepared lithium-ion battery.

A person skilled in the art understands that the method for preparing the electrochemical device (for example, the lithium-ion battery) described above is merely an example. To the extent not departing from the content disclosed herein, other methods commonly used in the art may be used.

An embodiment of this application further provides an electronic device containing the electrochemical device. The electronic device according to the embodiments of this application is not particularly limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, an unmanned aerial vehicle, a lighting appliance, a toy, a game machine, a watch, an electric tool, a flashlight, a camera, a large household storage battery, a lithium-ion capacitor, or the like.

Some specific embodiments and comparative embodiments are enumerated below to give a clearer description of this application, using a lithium-ion battery as an example.

Embodiment 1

Preparing a positive electrode plate: Mixing lithium iron phosphate (LiFePO$_4$) as a positive active material, conductive carbon black (Super P), and polyvinylidene difluoride (PVDF) at a mass ratio of 97.5:1.0:1.5, adding N-methyl-pyrrolidone (NMP) as a solvent, blending the mixture into a slurry with a solid content of 0.75, and stirring the slurry evenly. Coating a positive current collector aluminum foil with the slurry evenly, and drying under 90° C. to obtain a positive electrode plate. The load capacity is 1 mAh/cm$^2$. After completion of the coating, cutting the electrode plate into a size of 14 mm for future use.

Preparing a negative electrode plate: Dissolving 0.8 gram of PAN in 10 mL of N,N-dimethylformamide by performing both electrospinning and classic spraying, where the electrospinning uses polyacrylonitrile (PAN) as a precursor. After stirring the solution evenly, relocating the solution to a stainless steel syringe for electrospinning. The electrospinning parameters are set to the following values: 15 kV as voltage, 0.3 ml/h as feed speed, and 15 cm as distance from a collecting plate to a needle. Electrospraying a solution in which silica particles and polyvinylpyrrolidone (PVP) are a precursor, N,N-dimethylformamide is a solvent, a weight percent of PVP is 8%, and a concentration of the silica particles in the electrosprayed precursor solution is 18%. Setting an electrospray voltage to 20 kV. Distributing silica in a fiber framework stepwise by adjusting the feed speed in steps of 0.6-0.5-0.4-0.3 ml/h, where the thickness of the framework is 60 μm.

Placing a composite fiber, which is derived from the electrospinning and electrospraying, in a vacuum oven under 80° C. for 12 hours, and then pre-oxidizing the composite fiber in a muffle furnace. Increasing the temperature to 230° C. at a speed of 1° C. per minute in an air atmosphere, and keeping the temperature for 2 hours, and then increasing the temperature to 800° C. at a speed of 5° C. per minute in an argon atmosphere in a tube furnace, and keeping the temperature for 4 hours. Replenishing a carbon fiber film, which is obtained by the calcination, with lithium by cold calendering, where the lithium replenishment amount is 5 mg/cm$^2$. Die-cutting the material, which is obtained after the lithium replenishment, into a size of 18 mm for future use.

Preparing a separator: Using 15 μm-thick polyethylene (PE) as a separator.

Preparing an electrolytic solution: Mixing dioxolane (DOL) and dimethyl ether (DME) at a volume ratio of 1:1 in a dry argon atmosphere to obtain an organic solvent, and then adding lithium bis(trifluoromethanesulfonyl)imide (LiTFSI) as a lithium salt into the mixed organic solvent, and letting the lithium salt be dissolved and mixed evenly to obtain an electrolytic solution in which a lithium salt concentration is 1 mol/L.

Preparing a lithium-ion battery: stacking the positive electrode plate, the separator, and the negative electrode plate sequentially so that the separator is located between the positive electrode plate and the negative electrode plate to serve a function of separation, and winding the stacked materials to obtain an electrode assembly; Putting the electrode assembly in an aluminum plastic film that serves as an outer package, dehydrating the electrode assembly under 80° C., injecting the electrolytic solution, and performing sealing; and performing steps such as chemical formation, degassing, and edge trimming to obtain a lithium-ion battery.

The steps in other embodiments and comparative embodiments are the same as those in Embodiment 1 except changed parameter values. Specific changed parameter values are shown in the following table.

The thickness of the three-dimensional framework structure in Embodiments 2 and 3 is different from that in Embodiment 1.

The parameter values in Embodiment 4 are the same as those in Embodiment 1 except that the feed speed in the preparing the negative electrode plate is always 0.4 ml/h.

The parameter values in Embodiments 5 and 6 are the same as those in Embodiment 4 except that the type of the rigid particles is different from that in Embodiment 4.

Different from the steps in Embodiment 1, the steps of preparing a negative electrode plate in Embodiment 7 are: Dissolving 0.8 gram of PAN in 10 mL of N,N-dimethylformamide by performing electrospinning, in which polyacrylonitrile (PAN) is used as a precursor; after stirring the solution evenly, relocating the solution to a stainless steel syringe for electrospinning, where the electrospinning parameters are set to the following values: 15 kV as voltage, 0.3 ml/h as feed speed, and 15 cm as a distance from the collecting plate to the needle; placing a composite fiber, which is obtained from the electrospinning, in a vacuum oven under 80° C. for 12 hours, and then pre-oxidizing the composite fiber by using a muffle furnace; increasing the temperature to 230° C. at a speed of 1° C. per minute in an air atmosphere, and keeping the temperature for 2 hours, and then increasing the temperature to 800° C. at a speed of 5° C. per minute in an argon atmosphere in a tube furnace, and keeping the temperature for 4 hours to obtain a carbon fiber film; affixing insulation tape onto one side of the carbon fiber film; electroplating the carbon fiber film at a current of 100 mA/cm$^2$ by using an 18 wt % AgNO3 aqueous solution for a total duration of 180 s (once every 18 s, and repeating 10 times at intervals of 18 s), where the total electroplating capacity is 1 mAh/cm², replenishing a three-dimensional framework, which is obtained after the electroplating and in which the Ag particles are distributed stepwise, with lithium by cold calendering, where the lithium replenishment amount is 5 mg/cm²; and die-cutting the material, which is obtained after the lithium replenishment, into a size of 18 mm for future use.

A silica concentration in the electrosprayed precursor solution in Embodiment 8 is 5%, the feed speed is always 0.4 ml/h, and other parameter values are the same as in Embodiment 1.

The silica concentration in the electrosprayed precursor solution in Embodiment 9 is 40%, the feed speed is always 0.4 ml/h, and other parameter values are the same as in Embodiment 1.

The electrospinning parameters in Embodiment 10 are set to the following values: 9 kV as voltage, 0.6 ml/h as feed speed, and 15 cm as distance from the collecting plate to the needle. The silica concentration in the electrosprayed precursor solution is 40%, the feed speed is always 0.4 ml/h, and other parameter values are the same as in Embodiment 1.

The electrospinning parameters in Embodiment 11 are set to the following values: 20 kV as voltage, 0.3 ml/h as feed speed, and 10 cm as distance from the collecting plate to the needle. The silica concentration in the electrosprayed precursor solution is 40%, the feed speed is always 0.4 ml/h, and other parameter values are the same as in Embodiment 1.

In Embodiment 12, the electrosprayed precursor solution contains 18 wt % titanium dioxide, and other conditions are the same as in Embodiment 1. In Embodiment 13, the electrosprayed precursor solution contains 18 wt % zinc oxide, and other conditions are the same as in Embodiment 1. In Embodiment 14, the electrosprayed precursor solution contains 18 wt % tin dioxide, and other conditions are the same as in Embodiment 1.

In Embodiment 15, carbon cloth (commercially purchased, with a diameter of 10 μm) is used for electroplating under the same electroplating conditions as in Embodiment 7, and other conditions are the same as in Embodiment 7. In Embodiment 16, carbon paper (commercially purchased, with a diameter of 6 μm) is used for electroplating under the same electroplating conditions as in Embodiment 7, and other conditions are the same as in Embodiment 7.

In Comparative Embodiment 1, just electrospinning is performed, and no electrospraying is performed, and no lithiophilic material is distributed in the fiber film framework, and the thickness of the fiber film is 60 μm, and other parameters are the same as in Embodiment 1.

Different from the steps in Embodiment 1, the steps of preparing a negative electrode plate in Comparative Embodiment 2 are: Electrospraying a solution in which silica particles and PVP are a precursor, N,N-dimethylformamide is a solvent, a weight percent of the PVP is 8%, and a weight percent silica in the electrosprayed precursor solution is 18%; after the solution is stirred thoroughly and evenly, relocating the solution to a stainless steel syringe for electrospraying; setting the electrospray parameters to the following values: 20 kV as voltage, 0.4 ml/h as feed speed, and 20 cm as distance from the collecting plate to the needle; placing microspheres, which are obtained by the electrospraying, in a vacuum oven under 80° C. for 12 hours, and then increasing the temperature to 800° C. at a speed of 5° C. per minute in an argon atmosphere in a tube furnace, and keeping the temperature for 4 hours. Then mixing the microspheres derived from the electrospraying, conductive carbon black (Super P), and polyvinylidene difluoride (PVDF) at a mass ratio of 97.5:1.0:1.5, adding N-methylpyrrolidone (NMP) as a solvent, blending the mixture into a slurry with a solid content of 0.35, and stirring the slurry evenly. Coating a negative current collector aluminum foil with the slurry evenly, and drying the aluminum foil under 90° C. to obtain a negative electrode plate of 60 μm in thickness. Replenishing the negative electrode plate with lithium by cold calendering, where the lithium replenishment amount is 5 mg/cm². Die-cutting the material, which is obtained after the lithium replenishment, into a size of 18 mm for future use.

The thickness of the three-dimensional framework structure in Comparative Embodiment 3 is different from that in Embodiment 1.

Different from the steps in Embodiment 1, the steps of preparing a negative electrode plate in Comparative Embodiment 4 are: Die-cutting a 20 μm-thick lithium-copper composite strip directly into a size of 18 mm to serve as a negative electrode plate.

The following describes the parameter testing methods in this application.

Testing Mohs Hardness:

Using a scratch method to scratch the surface of a sample mineral with a pyramidal diamond drill bit, and then determining relative hardness of the material based on the scratch.

Testing an Elastic Modulus:

Testing an elastic modulus of the material based on the national standard GB/T 22315-2008.

Testing a Porosity:

Testing the porosity of a functional layer by a mercury intrusion method based on the national standard GB/T 21650.1-2008.

Testing an Average Particle Diameter:

Testing a particle size distribution by a sieving method based on the national standard GB/T 21782.1-2008.

Testing a Thickness Under Compression:

Measuring the thickness in-situ, and exerting different pressures on a structured negative electrode framework to test the deformation value of the electrode plate material under different pressures.

Testing Cycle Performance:

Charging a battery under 20° C. at a constant current rate of 0.2 C until a voltage of 3.7 V by using a LAND electrochemical workstation, and then charging the battery at a constant voltage until the current reaches 0.025 C, leaving the battery to stand for 5 minutes, and then discharging the battery at a constant current of 0.5 C until the voltage reaches 2.55 V; leaving the battery to stand for 5 minutes, thereby completing one cycle. The cycle performance is the number of cycles when the discharge capacity attenuates to 80% of the first-cycle discharge capacity. The volume of the battery at the first discharge is used as an initial volume, and a ratio of the volume of the battery reaching such number of cycles to the initial volume of the battery is used as an indicator of the volume expansion of the lithium-ion battery. The volume of the battery is a product of length, width, and height.

Table 1 shows parameters and evaluation results in Embodiments 1 to 16 and Comparative Embodiments 1 to 4.

TABLE 1

|   | Composition of material of three-dimensional framework structure | Thickness of three-dimensional framework structure (μm) | Mass percent of rigid particles | Fiber diameter (μm) | Thickness under a 0 kg pressure (μm) |
|---|---|---|---|---|---|
| Embodiment 1 | Carbon fiber, stepwise distributed silica | 60 | 45% | 0.4-0.5 | 60 |
| Embodiment 2 | Carbon fiber, stepwise distributed silica | 200 | 45% | 0.4-0.5 | 200 |
| Embodiment 3 | Carbon fiber, stepwise distributed silica | 20 | 45% | 0.4-0.5 | 20 |
| Embodiment 4 | Carbon fiber, homogeneously distributed silica | 60 | 45% | 0.4-0.5 | 60 |
| Embodiment 5 | Carbon fiber, homogeneously distributed zinc oxide | 60 | 45% | 0.4-0.5 | 60 |
| Embodiment 6 | Carbon fiber, homogeneously distributed titanium dioxide | 60 | 45% | 0.4-0.5 | 60 |
| Embodiment 7 | Carbon fiber, stepwise distributed silver (electroplated) | 60 | 45% | 0.4-0.5 | 60 |
| Embodiment 8 | Carbon fiber, homogeneously distributed silica | 60 | 12.5% | 0.4-0.5 | 60 |
| Embodiment 9 | Carbon fiber, homogeneously distributed silica | 60 | 64% | 0.4-0.5 | 60 |
| Embodiment 10 | Carbon fiber, homogeneously distributed silica | 60 | 45% | 0.15-0.2 | 60 |
| Embodiment 11 | Carbon fiber, homogeneously distributed silica | 60 | 45% | 2-3 | 60 |
| Embodiment 12 | Carbon fiber, stepwise distributed titanium dioxide | 60 | 45% | 0.4-0.5 | 60 |
| Embodiment 13 | Carbon fiber, stepwise distributed zinc oxide | 60 | 45% | 0.4-0.5 | 60 |
| Embodiment 14 | Carbon fiber, stepwise distributed tin dioxide | 60 | 45% | 0.4-0.5 | 60 |
| Embodiment 15 | Carbon cloth, stepwise distributed silver (electroplated) | 60 | 45% | 8-10 | 60 |
| Embodiment 16 | Carbon paper, stepwise distributed silver (electroplated) | 60 | 45% | 5-6 | 60 |
| Comparative Embodiment 1 | Pure carbon fiber | 60 | None | 0.4-0.5 | 60 |
| Comparative Embodiment 2 | Pure silica microspheres | 60 | 100% | None | 60 |
| Comparative Embodiment 3 | Carbon fiber, stepwise distributed silica | 300 | 45% | 0.4-0.5 | 300 |
| Comparative Embodiment 4 | Lithium-copper composite strip | 60 | None | None | 60 |

|   | Thickness under a 30 kg pressure (μm) | Thickness under a 60 kg pressure (μm) | Thickness under a 90 kg pressure (μm) | Thickness under a 130 kg pressure (μm) | Number of cycles | Volume expansion rate |
|---|---|---|---|---|---|---|
| Embodiment 1 | 60 | 59 | 58 | 57.5 | 200 | 20% |
| Embodiment 2 | 197 | 194 | 193 | 191 | 180 | 20% |
| Embodiment 3 | 20 | 19.3 | 19.1 | 18.9 | 135 | 25% |
| Embodiment 4 | 60 | 59 | 57 | 57 | 150 | 50% |
| Embodiment 5 | 60 | 57 | 57 | 56 | 142 | 53% |
| Embodiment 6 | 60 | 55 | 55 | 54 | 148 | 57% |
| Embodiment 7 | 38 | 35 | 32 | 27 | 110 | 80% |
| Embodiment 8 | 45 | 43 | 43 | 42 | 125 | 60% |
| Embodiment 9 | 60 | 59 | 59 | 58.5 | 120 | 65% |
| Embodiment 10 | 60 | 59 | 57 | 57 | 128 | 50% |
| Embodiment 11 | 60 | 59 | 57 | 57 | 134 | 45% |
| Embodiment 12 | 60 | 55 | 55 | 54 | 165 | 53% |
| Embodiment 13 | 60 | 57 | 57 | 56 | 162 | 51% |
| Embodiment 14 | 60 | 57 | 56 | 55 | 163 | 54% |
| Embodiment 15 | 47 | 43 | 35 | 32 | 100 | 78% |
| Embodiment 16 | 51 | 45 | 36 | 33 | 96 | 82% |
| Comparative Embodiment 1 | 33 | 30 | 25 | 22 | 50 | 200% |
| Comparative Embodiment 2 | 60 | 59 | 59 | 59 | 65 | 45% |

TABLE 1-continued

| | | | | | | |
|---|---|---|---|---|---|---|
| Comparative Embodiment 3 | 295 | 292 | 288 | 285 | 90 | 75% |
| Comparative Embodiment 4 | 60 | 59 | 59 | 57 | 50 | 200% |

As can be seen from comparison between Embodiment 4 and Comparative Embodiment 1, with the rigid particles used in the three-dimensional framework structure, the thickness variation of the three-dimensional framework structure under compression is reduced significantly, the number of cycles is increased significantly, and the volume expansion rate is reduced significantly.

As can be seen from comparison between Embodiments 1, 2, and 3 and Comparative Embodiment 3, as the thickness of the three-dimensional framework structure increases, the number of cycles of the electrochemical device increases first, and then decreases, and the volume expansion rate of the electrochemical device is deteriorated when the thickness of the three-dimensional framework structure is greater than 200 µm. The thickness of the three-dimensional framework structure is preferably 60 µm. When the thickness of the electrode plate is less than 20 µm, the lithium metal is unable to be completely deposited into the three-dimensional framework, and a part of the lithium metal tends to deposit on the surface of the negative electrode, thereby failing to suppress the volume expansion of the lithium metal. When the thickness of the three-dimensional framework structure is 200 µm or more, the utilization rate of the electrode plate is relatively low, and side reactions increase, thereby affecting the cycle performance of the electrochemical device.

As can be seen from comparison between Embodiments 1, 4, 5, and 6, the stepwise distribution of silica can induce the lithium metal to deposit inside the electrode plate framework, thereby mitigating the volume expansion of the electrode plate and improving the cycle performance of the electrochemical device. In addition, the silica is more capable of wetting than titanium oxide and zinc oxide, and therefore, increases the number of cycles and reducing the volume expansion rate to some extent. The same results can be obtained from comparison between Embodiments 5, 6, 12, and 13.

As can be seen from comparison between Embodiment 1 and Embodiment 7, in comparison with the three-dimensional framework structure using the electroplating silver as the rigid particles, the thickness variation of the three-dimensional framework structure using silica as the rigid particles under compression is smaller, the cycle performance is higher, and the volume expansion rate is lower. That is because the electroplating silver is attached to the fiber surface in the form of tiny particles, and therefore, is relatively weak in supporting the fiber framework.

As can be seen from comparison between Embodiment 4 and Embodiments 8 and 9, as the mass percent of the rigid particles in the three-dimensional framework structure increases, the thickness variation under force is smaller, the cycle performance improves first and then declines, and the volume expansion rate decreases first and then increases. If the mass percent of the rigid particles in the three-dimensional framework structure is too low, the rigid particles are relatively weak in supporting the framework, and are relatively ineffective in wetting. However, if the mass percent of the rigid particles is too high, the stability of the three-dimensional framework structure is low, and the effect of mitigating the volume expansion of the electrode plate is relatively poor.

As can be seen from comparison between Embodiment 4 and Embodiments 10 and 11, as the diameter of the framework fiber increases, the cycle performance improves first and then declines, and the volume expansion rate shows a tendency to decrease. The diameter of the framework fiber affects the exertion of the performance of the electrode plate. When the fiber diameter is too small, the porosity of the fiber will decrease to some extent, and the internal pore diameter of the framework will decrease. Consequently, the deposition process of the lithium metal is hindered to some extent, and the electrochemical performance is affected. When the fiber of the three-dimensional framework structure is too thick, the fiber itself is too rigid and is prone to pierce the separator and result in a short circuit of the electrochemical device.

As can be seen from comparison between Embodiments 7, 15 and 16, regardless of the type of the carbon material, the three-dimensional framework structure can be formed, the cycle performance of the electrochemical device can be improved, and the volume expansion can be mitigated.

As can be seen from comparison between Embodiment 1 and Comparative Embodiment 2, the electrode containing only rigid particles is unable to form a three-dimensional framework structure, so that the volume expansion is not well controlled and the cycle performance is relatively low.

As can be seen from comparison between Embodiment 1 and Comparative Embodiment 4, compared with a pure lithium-copper composite strip, the three-dimensional framework structure can accommodate the lithium metal, mitigate the volume expansion of the electrode plate, and improve the cycle stability.

The foregoing descriptions are merely about exemplary embodiments of this application and the technical principles applied. A person skilled in the art understands that the scope of disclosure in this application is not limited to the technical solutions formed by a specific combination of the foregoing technical features, but also covers other technical solutions formed by arbitrarily combining the foregoing technical features or equivalents thereof, for example, a technical solution formed by replacing any of the foregoing features with a technical feature disclosed herein and serving similar functions.

What is claimed is:

1. A negative electrode plate, comprising:
   a three-dimensional framework structure, wherein the three-dimensional framework structure comprises fibers and rigid particles, a Mohs hardness of the rigid particles is greater than or equal to 2, and an elastic modulus of the rigid particles is greater than or equal to 40 Gpa; and
   a negative current collector, wherein the three-dimensional framework structure is located on the negative current collector; and in the three-dimensional framework structure, a mass percent of the rigid particles decreases with the increase in distance from the negative current collector.

2. The negative electrode plate according to claim 1, wherein
a thickness of the three-dimensional framework structure is 18 μm to 200 μm.

3. The negative electrode plate according to claim 1, wherein a total mass percent of the rigid particles in the three-dimensional framework structure is 5% to 95%.

4. The negative electrode plate according to claim 1, wherein a porosity of the three-dimensional framework structure is 5% to 95%.

5. The negative electrode plate according to claim 1, wherein the mass percent of the rigid particles in the three-dimensional framework structure decreases stepwise with increase of distance from the negative current collector.

6. The negative electrode plate according to claim 1, wherein the three-dimensional framework structure is equally divided into a first part, a second part, and a third part in a thickness direction of the three-dimensional framework structure in ascending order of a distance from the negative current collector; based on a mass of the first part, a mass percent of the rigid particles in the first part is greater than 60%; based on a mass of the second part, a mass percent of the rigid particles in the second part is 20% to 60%; and based on a mass of the third part, a mass percent of the rigid particles in the third part is less than 20%.

7. The negative electrode plate according to claim 1, wherein
an average particle diameter of the rigid particles is 100 nm to 20 μm.

8. The negative electrode plate according to claim 1, wherein the rigid particles comprise at least one of Ag, Au, Zn, $TiO_2$, $SiO_2$, ZnO, $SnO_2$, $Co_3O_4$, $Fe_2O_3$, $Mo_2N_3$, $MoS_2$, $SnS_2$, or a polymer containing at least one of the following groups: a hydroxyl group, an ester group, a carboxyl group, an amino group, or a sulfo group.

9. The negative electrode plate according to claim 1, wherein
the fibers comprise at least one of a metal fiber, a carbon-based material fiber, or a polymer fiber.

10. The negative electrode plate according to claim 1, wherein
a diameter of the fibers is 100 nm to 20 μm.

11. The negative electrode plate according to claim 1, wherein
a thickness deformation amount t of the three-dimensional framework structure under compression and a thickness T of the three-dimensional framework structure satisfy: t≤10% T, wherein the compression is a pressure greater than 0 kg/cm² and less than or equal to 130 kg/cm².

12. The negative electrode plate according to claim 1, wherein a thickness h of a part of the three-dimensional framework structure containing lithium element and the thickness T of the three-dimensional framework structure satisfy: h≥30% T.

13. An electrochemical device, comprising:
a positive electrode plate;
a negative electrode plate; and
a separator, located between the positive electrode plate and the negative electrode plate, wherein
the negative electrode plate comprises:
a three-dimensional framework structure, wherein the three-dimensional framework structure comprises fibers and rigid particles, a Mohs hardness of the rigid particles is greater than or equal to 2, and an elastic modulus of the rigid particles is greater than or equal to 40 Gpa; and
a negative current collector, wherein the three-dimensional framework structure is located on the negative current collector; and in the three-dimensional framework structure, a mass percent of the rigid particles decreases with the increase in distance from the negative current collector.

14. The electrochemical device according to claim 13, wherein a thickness of the three-dimensional framework structure is 18 μm to 200 μm.

15. The electrochemical device according to claim 13, wherein a diameter of the fibers is 100 nm to 20 μm.

16. The electrochemical device according to claim 13, wherein an average particle diameter of the rigid particles is 100 nm to 20 μm.

17. The electrochemical device according to claim 13, wherein a thickness deformation amount t of the three-dimensional framework structure under compression and a thickness T of the three-dimensional framework structure satisfy: t≤10% T; wherein the compression is a pressure greater than 0 kg/cm² and less than or equal to 130 kg/cm².

18. The electrochemical device according to claim 13, wherein a thickness h of a part that is of the three-dimensional framework structure and that contains lithium element and the thickness T of the three-dimensional framework structure satisfy: h≥30% T.

19. An electronic device, comprising the electrochemical device according to claim 13.

* * * * *